Patented Feb. 7, 1928.

1,658,628

UNITED STATES PATENT OFFICE.

JAMES ELIOT BOOGE, MARION L. HANAHAN, AND JOSEPH P. KOLLER, OF WILMINGTON, DELAWARE, ASSIGNORS TO E. I. DU PONT DE NEMOURS & COMPANY, OF WILMINGTON, DELAWARE, A CORPORATION OF DELAWARE.

PRODUCTION OF LITHOPONE.

No Drawing. Application filed April 23, 1924. Serial No. 708,326.

This invention relates to the production of lithopone and has particular relation to preparation of the dried raw or crude lithopone for calcination, and to the calcination of crude lithopone prepared in accordance with the invention. The principal object of the invention is to improve the properties of the lithopone produced, this object being attained, according to the invention, by preparing, and using for the charge for the calcination furnace, crude lithopone whose particles or granules are of substantially uniform size throughout the charge.

Generally stated, the invention comprises removing from the crude crushed lithopone oversize particles and undersize particles, to give a charge composed of particles whose sizes lie between quite close and well defined limits, that is, are for present purposes substantially uniform. Practically and preferably, this is done by screening the crushed lithopone upon a screen of relatively large mesh, corresponding to the maximum limit of size, and rejecting the oversize particles; and then screening the particles passed by the first screen upon a screen of relatively small mesh corresponding to the minimum limit of size, and rejecting the fines. The thus selected and refined crushed lithopone is used for the charge. The use of such a charge results, we have found, in a lithopone of improved properties, as will hereafter more fully appear. The lithopone rejected in the screening is, if over size, returned to the crusher, or otherwise further reduced in size, and the fines mixed with fresh crude lithopone slurry, to be again presed, dried, crushed and screened. Thus the present method, while highly advantageous, results in no loss of lithopone.

As is, of course, well understood, lithopone is a white pigment consisting usually of approximately equi-molecular quantities of barium sulfate and zinc sulfide, although the proportion may be varied if desired. It is customarily made by the mutual precipitation of these two compounds from solutions of barium sulfide and zinc sulfate prepared by methods well known in the art. The precipitate which is known as raw or crude lithopone is filtered, dried, calcined at red heat, quenched in water, ground to a high degree of fineness, washed with water, blued, filtered, dried, disintegrated and packed. Lithopone has a variety of uses as a pigment; for example, in the manufacture of paints, oil cloth, linoleum, window shade cloth, and in the rubber industry.

The properties of the finished lithopone are very greatly affected by the conditions under which the material is calcined. For example, lithopone which is under-calcined, i. e., not heated for a sufficient length of time or to a sufficiently high temperature, not only has the fault of possessing a high oil absorption and not yielding satisfactory paint with an oil or varnish vehicle, but in addition, has the fault of poor tinting strength, hiding power and color. On the other hand, lithopone which is over-calcined, i. e., heated for too long a time or to too high a temperature, may possess too low an oil absorption for satisfactory paint purposes. Again, if very much over-calcined, it will possess lower tinting strength and hiding power than material which has been properly calcined. Also it is apt to be hard and gritty and also to be of poor color.

The specific conditions for proper calcination vary with the nature of the crude lithopone and the manner in which it has been prepared. In any case, however, it is essential, if the best quality is to be obtained, that every particle be subjected to the same calcination treatment, i. e., be heated for the same length of time and to the same temperature; even a relatively small portion of under-calcined or over-calcined material appreciably lowers the quality of the entire product.

The importance of uniformity of calcination throughout the entire mass of lithopone undergoing calcination has been heretofore noted, it having been previously pointed out in the copending application under the name of James Eliot Booge on "lithopone and process of manufacturing same", Serial No. 550,185 and been recognized in U. S. Patents 1,411,645 and 1,411,646 pertaining to the manufacture of lithopone. In this connection there is mentioned in said copending application the advantage of agitating the lithopone during calcination, and is also mentioned the advantage of crushing the crude lithopone. Agitation takes care of uniform calcination of different parts of the mass of lithopone, while crushing takes care of uniform calcination throughout different parts of the same lump of pigment.

Due to the poor heat conductivity of a lump of lithopone heat travels from the exterior to the interior portion thereof at a very slow rate. In consequence, unless special precautions are taken, as for example calcining for a long period of time and heating at a very slow rate, the exterior layers of a lump of lithopone are apt to be greatly over-calcined before the interior of the lump has reached the proper calcination temperature. (This is more particularly true if the lump is large—say more than ½ or 1 inch in size; in fact, theoretically, the smaller the lumps of lithopone, the more uniform will the effect of calcination be throughout the lump.) But from a practical standpoint, heating slowly for a long period of time is disadvantageous since it results in a low capacity for a calcining furnace of given size and hence very greatly increases the installation cost required for a given output. Hence, crushing constitutes a very advantageous if not absolutely necessary step in the process if uniform calcination is to be obtained.

Now, not only is it advantageous to crush the lithopone in order to obtain relatively small lumps for the reasons discussed above, particularly when the lithopone is to be calcined in a continuous kiln such as is described in the copending application under the name of William J. Lindsay, Serial No. 502,101, which discloses a continuous rotary furnace, of the horizontal type (slightly inclined to cause gradual travel and agitation of the material therein), heated internally and so constructed as to exclude air in order that the zinc sulphide may not be oxidized, but also, we have found, it is advantageous, (and herein more particularly lies the present invention) to eliminate the oversize and "fines", preferably by passing the crude lithopone over or through screens. This gives crude lithopone for calcination which is in the form of lumps or granules which are not only relatively small (as compared with the broken press cake ordinarily fed to lithopone muffles) but which are also relatively uniform in size. By "lumps" we mean particularly particles of a size materially greater than those obtained by pulverizing, i. e. reducing to a powder. Lumps are, say, granules that will not pass a 100 mesh screen as distinguished from the powder or dust obtained by pulverization. It has been found that the proper calcination of a powder or dust is impracticable.

In carrying out this invention, the dry crude lithopone press cake may be first crushed in any suitable type of crusher, but preferably one yielding a minimum amount of fines. Either a roll crusher or a jaw crusher is satisfactory for this purpose. The crushed lithopone is then passed over a screen, the openings of which are such as to allow the passage only of material below a certain specified size. The oversize material is returned to the crusher. Hence all of the crude lithopone eventually passes through the first screen; that is to say, only such lithopone as is small enough to pass the screen, is used for the furnace charge. The openings in this first screen may be of any desired size from, say, about 1/8" to 1". In practice we have found the use of a screen with 3/8" openings to be highly satisfactory, although we do not limit our invention to the use of any particular one of the various screen sizes proper in the practice of the invention.

In further accordance with the invention the material is next passed over a screen with relatively small openings in order to remove the "fines". We have found a 20 mesh (1/20" openings) screen satisfactory for this purpose although a somewhat finer or coarser screen, say 10 to 100 mesh (1/10" to 1/100" openings) may, of course, be used. The material not passing the screen is that used for the charge. Thus, the charge is composed only of granules of substantially uniform size. The "fines" separated by the second screen are returned to the vats or tubs in which the crude lithopone is originally precipitated, and are there mixed with fresh crude lithopone slurry, after which they are filter pressed, dried and again returned to the crusher and screens. In this manner there is no loss of material due to screening.

The practice of screening the crude lithopone possesses several distinct advantages as compared with crushing alone, particularly when the calcination is carried out in the continuous kiln type of calcining furnace already mentioned:—

(1) The greater uniformity of lump size, results in a more uniform rate of travel of all material thru the kiln and consequently results in greater uniformity of calcination. This is the result of the well known fact that larger lumps of material will ordinarily travel through a slightly inclined, rotating cylinder, at a greater rate than finer material. The greater uniformity of lump size obtained by screening crude lithopone as described, therefore results in a greater uniformity in the time required for different parts of the lithopone mass to travel through the kiln—thus resulting in more uniform calcination.

(2) The removal of "fines" is advantageous from two viewpoints: (a) When "fines" are present, a large amount of lithopone dust is carried along with the gases escaping from the kiln. This material can only be recovered by the installation of expensive dust collectors. If dust collectors are not employed, the dust losses amount to an appreciable waste of valuable material.

(b) In order to cool the hot combustion gases used for heating the lithopone to the desired calcining temperature, it is economical and advantageous to dilute them with the hot gases escaping from the "cold" end of the kiln. Any lithopone dust contained in these gases will be passed directly thru the intensely hot combustion chamber which is heated to a temperature far above any at which lithopone can be properly calcined. This results in a sintering and very great over burning of all the lithopone dust passing through the combustion chamber. This material, being extremely poor in color and texture (hard, and gritty) detracts from the quality of the product as a whole. Yet dust separators have not proved entirely efficient in removing the dust from the return gases. The removal of fines, therefore, not only prevents a loss of lithopone as dust in the gases escaping from the kiln—but results in an improvement in the quality of the product calcined in this manner.

Altho the discussion above has been confined especially to the advantages resulting from screening the crude lithopone when the latter is calcined in a continuous kiln, it will be understood that screening can be used to improve the uniformity of calcination in other types of muffles. Even in the case of the old type of muffle in which the lithopone is rabbled by hand during muffling, greater uniformity of muffling would result by the use of material of uniform lump size. Hence, this invention is not limited to application with the type of muffle which we prefer to use, but may be applied to any type of muffle.

It will also be understood that instead of using two screens, as described above, a series of screens might be used—for example a series of screens A, B, and C, possessing openings of decreasing size. The oversize from A would be returned to the crusher; material passing A and not B would be calcined separately from material passing B and not C; and material passing C, consisting of fines, would be returned to the precipitation tubs. In this manner a number of screens might be combined to advantage. In practice, however, we have found the use of two screens to be sufficient to yield highly satisfactory results. In fact, the use of a single screen to separate the oversize from the crushed lithopone is found to improve the uniformity of lump size and hence of calcination. Using a single screen in this manner the crusher can be adjusted to a wider opening—resulting in the production of less fines than when crushing alone is employed to reduce all material to below a specified size. From the above, it will be understood that our invention is not limited to the specific number of screens employed. The use of two screens as described is, however, our preferred practice.

It will be further understood that although crushing the crude lithopone before screening is our preferred practice, other means might be employed for breaking up the original press cake before screening it; also that other methods than screening might be resorted to in order to obtain material of relatively uniform lump size. For example, fines might be removed by a system of air separation. We wish to point out, therefore, that the general object of our invention is the preparation of crude lithopone in such form that the lumps or granules of which it is composed will be relatively uniform in size, and that we do not limit our invention to the use of screens or to any particular means of accomplishing this object. In this connection, it is to be particularly noted that, in accordance with the present invention, those granules which are over, and those granules which are under, the adopted limits of size are removed from the lithopone charge; wherefore that charge contains, for practical purposes, no out-size granules. The present method and product are, then, to be clearly distinguished from mere crushing not followed by removal of granules which do not actually fall within the size limits. In the case of such mere crushing, while the product may to a considerable extent conform to specified sizes, it yet contains all granules that the crusher delivered, whether over- or under-size, the amount of such particles depending on the accuracy of the crushing, which crushing can not at best be other than approximately correct of course. In the present case, the granules not conforming to standard are positively rejected, resulting in a substantially uniform product.

It will be understood that the charge, prepared in accordance with the present invention, may be calcined with exclusion of air, in accordance with the Booge application before referred to, and in the furnace of the mentioned Lindsay application, but is, of course, not restricted to such use.

We claim:

1. In the production of lithopone, the steps of screening the prospective charge, for the calcination furnace, upon a screen conforming to a specified lower size limit for the lumps of the final charge, and rejecting all lumps passed by the screen, thereby to provide a final charge substantially composed throughout of lumps not below said specified size limit and calcining the thus refined charge with exclusion of air.

2. In the production of lithopone, the steps of screening the prospective charge, for the calcination furnace, upon a pair of screens conforming to an upper size limit and a lower size limit for the lumps of the final recharge, and rejecting all lumps not falling within both limits, thereby to provide a final charge substantially composed throughout of lumps within said size limits.

3. In the production of lithopone, the steps of screening the prospective charge, for the calcination furnace, upon a pair of screens, the one three-eighths inch mesh and the other one-twentieth inch mesh, and rejecting all lumps not falling within the screen-imposed limits, thereby to provide a final charge substantially composed throughout of lumps within said limits and calcining the thus refined charge with exclusion of air.

4. In the production of lithopone, the steps of removing from the prospective charge, for the calcination furnace, substantially all lumps thereof above and below specified size limits, and calcining the thus refined charge with exclusion of air.

5. In the production of lithopone, the steps of removing from the prospective charge, for the calcination furnace, substantially all lumps thereof above and below specified size limits, and calcining the thus refined charge with exclusion of air with inclined-rotary-furnace-derived travel and agitation.

6. In the production of lithopone, the steps of removing from a prospective charge, for the calcination furnace, substantially all lumps below a specified size, resubjecting the rejected lumps to wetting, filter pressing, drying, reducing, and removal of undersize lumps, and so on, thus to convert all of the prospective furnace charge into a mass substantially composed throughout of lumps not below the specified size.

7. In the production of lithopone, the steps of reducing the prospective charge, for the calcination furnace, removing from the reduced prospective charge substantially all lumps thereof above a specified size, additionally reducing the thus rejected lumps to provide an additional prospective charge, removing from the original reduced prospective charge substantially all lumps below a specified size, resubjecting the thus rejected lumps to wetting, filter pressing, drying and reducing to provide a second additional prospective charge, treating the additional prospective charges as specified for the original prospective charge, and repeating as necessary, to convert the entire prospective charge into a furnace charge substantially composed throughout of lumps of uniform size.

8. In the production of lithopone, a lithopone charge for the calcination furnace, substantially composed throughout of lumps which will pass a one-mesh screen but will not pass a screen finer than one-hundred mesh.

9. In the production of lithopone, a lithopone charge, for the calcination furnace, substantially composed throughout of lumps which will pass a three-eighth-inch mesh screen but will not pass a screen finer than one-twentieth-inch mesh.

10. In the production of lithopone, a lithopone charge, for the calcination furnace, substantially composed throughout of lumps which will pass a one-inch to one-eighth inch mesh screen but will not pass a screen finer than a one-tenth-inch to a one-hundredth-inch mesh.

In testimony whereof we affix our signatures.

JAMES ELIOT BOOGE.
MARION L. HANAHAN.
JOSEPH P. KOLLER.